June 29, 1926. 1,590,495
P. R. CAMPION
WINDMILL
Filed August 28, 1924 2 Sheets-Sheet 1
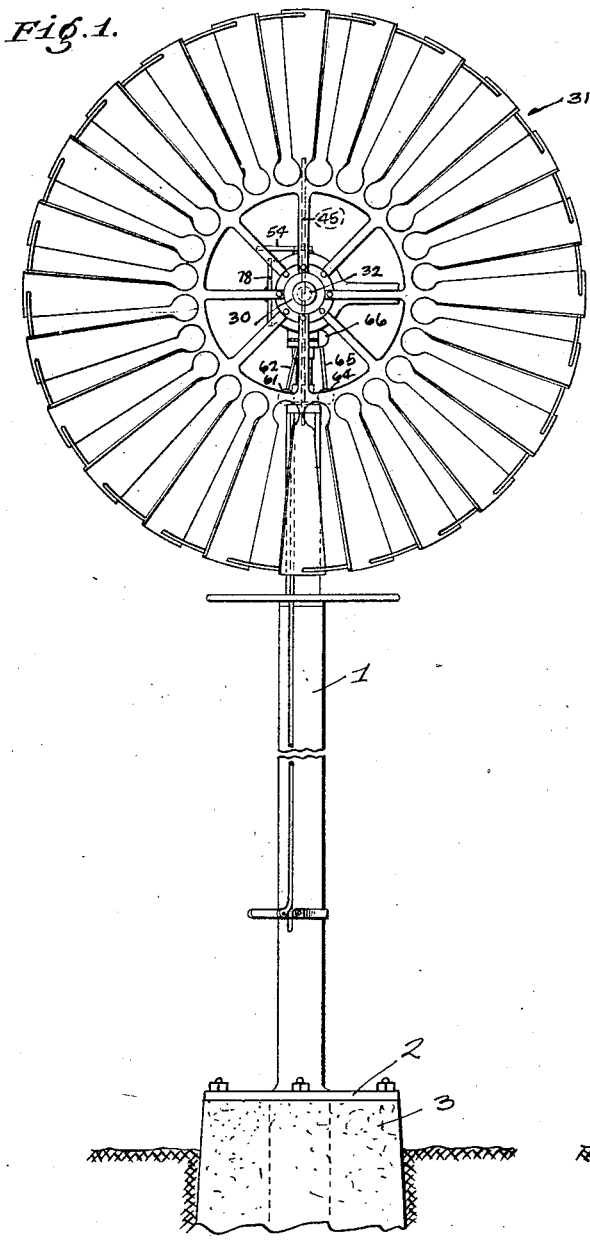
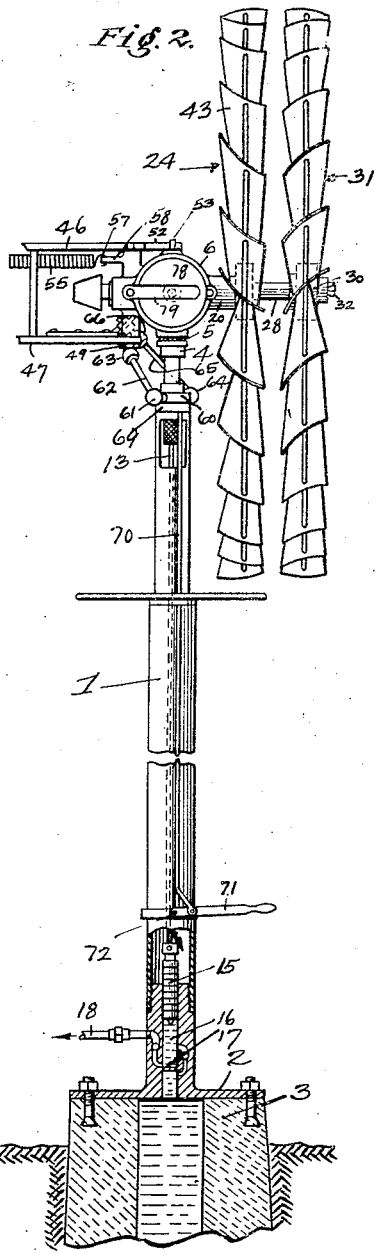
INVENTOR
PATRICK R. CAMPION
BY
Lincoln Johnson
ATTORNEY

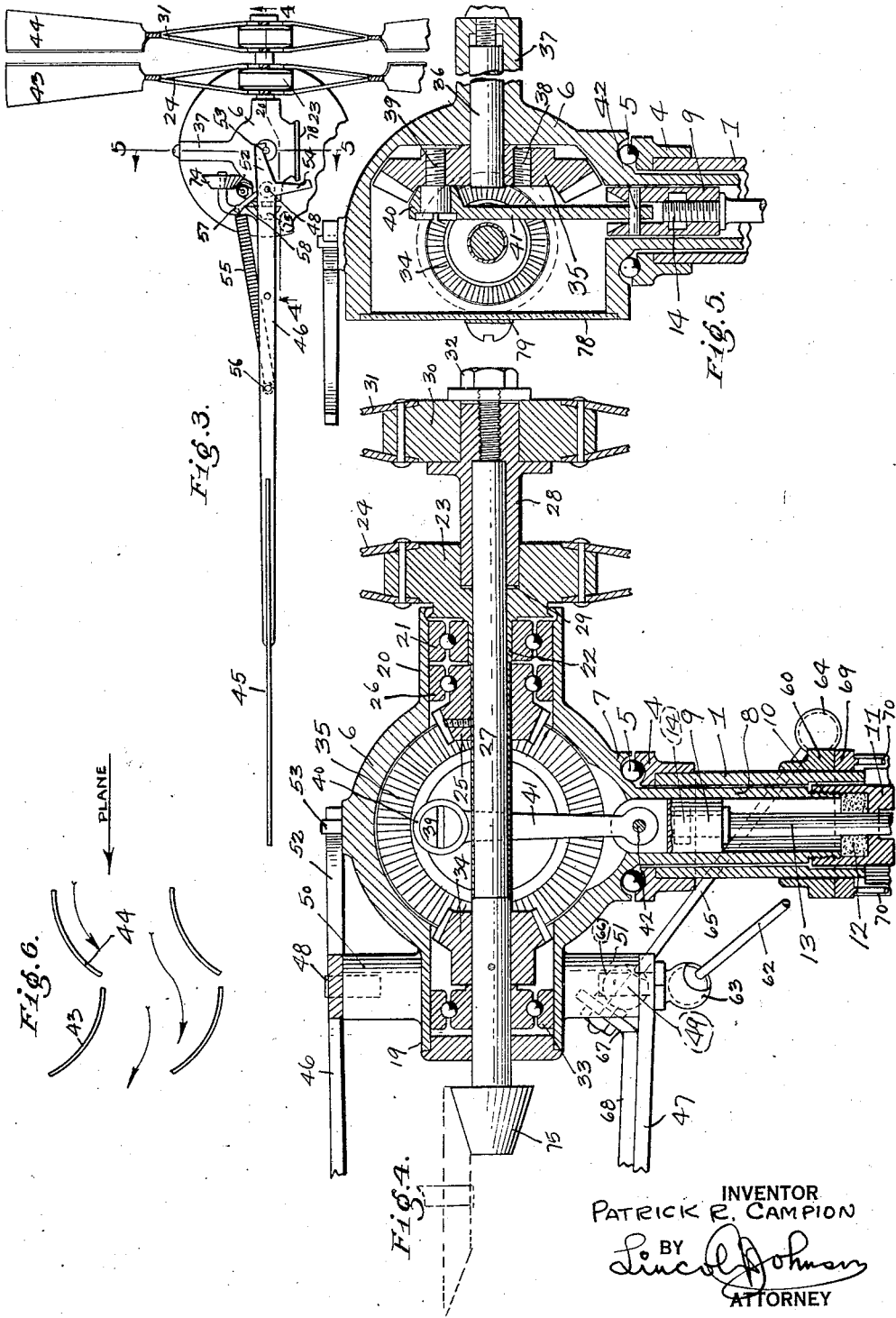

Patented June 29, 1926.

1,590,495

UNITED STATES PATENT OFFICE.

PATRICK R. CAMPION, OF OAKLAND, CALIFORNIA, ASSIGNOR TO THOMAS H. FOLEY, OF OAKLAND, CALIFORNIA.

WINDMILL.

Application filed August 28, 1924. Serial No. 734,612.

This invention relates particularly to an air driven power generating device.

An object of the invention is to provide a "windmill" having a plurality of wind fans thereon, adapted to revolve in opposite directions on a common axis, to increase the power development of the mill.

A further object of the invention is to provide a "windmill", freely revoluble on a supporting tower, and having a tail or rudder pivotally mounted thereon, capable of assuming an operative position varying from a right angle to the path of rotation of the wind fans or parallel thereto.

Other objects of the invention are to provide a "windmill" having a tail thereon and means by which the said tail may be manually moved into an inoperative position, relative to the wind fans; a "windmill" having revolubly mounted wind fans and a tail thereon and means operative by the said tail when in the inoperative position for controlling and regulating the rotation of the wind fans; and a "windmill" that will be superior in point of simplicity, inexpensiveness of construction, positiveness of operation, and facility and convenience in use and general efficiency.

Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying two sheets of drawings.

Fig. 1 represents a front elevation of a "windmill" constructed in accordance with my invention.

Fig. 2 is a side elevation of Fig. 1.

Fig. 3 is a plan view of Fig. 2.

Fig. 4 is an enlarged cross-section taken through Fig. 3 on the line 4—4.

Fig. 5 is an enlarged section taken through Fig. 3 on the line 5—5.

Fig. 6 is a fragmentary detail showing the relation of the blades on the wind fans.

In detail, the construction illustrated in the drawings, comprises the supporting frame 1 of a "windmill", which may be of tubular cross-section as shown in the drawings, or if preferred, constructed out of angle iron into the usual type of tower structure. In the present instance I have shown the supporting frame 1 provided with a flange 2, mounted on a well foundation 3. The upper end of the frame 1 is provided with an annular collar 4 thereon suitably recessed to provide a race for the anti-friction bearing 5. A substantially hollow and spherical base member 6 is provided with an annular shoulder 7, on the bottom side thereof, to conformably engage with the anti-friction bearing 5 to permit the base 6 to be freely revoluble around the bearing 5.

The base 6 is provided with a hollow conduit 8 arranged centrally within the shoulder 7, said conduit 8 extending within the upper end of the supporting frame 1. The interior of the tubular member 8 is drilled out to a perfect circular cross-section throughout its entire length to form a cylindrical housing in which the plunger or yoke member 9 can be freely reciprocated. The lower end of the tubular member 8 is reduced and threaded as at 10 and a packing gland 11 is removably engaged with the threaded end 10 of the conduit 8 to confine the packing 12 between the gland 11 and the end of the tube 8. A shaft 13 is mounted within the interior of the frame 1, the shaft passes through the packing gland 11 and packing 12 and is secured at its upper end 14 to the plunger 9. The lower end of the shaft 13 is provided with a plunger element 15 thereon which works within a chamber 16 communicating with the well housed by the foundation 3. A suitable valve mechanism 17 is mounted adjacent the lower end of the supporting frame 1 in communication with the chamber 16 so that reciprocating movement of the plunger 15 causes fluid to be discharged from the pump chamber 16 outwardly through the pipe 18. Although I have shown the lower end of the shaft 13 provided with a plunger thereon and adapted to co-act in conjunction with a fluid pumping mechanism, it is to be understood that the shaft 13 is primarily a work driving shaft and any other form of desired working mechanism might be substituted in lieu of the fluid pumping mechanism, in order to accomplish the results desired to be effected by my invention.

The base member 6 is provided with separate hub members 19 and 20 on diametrically opposite sides thereof, the axis of the hub members lying on a substantially horizontal plane. An anti-friction bearing 21 is mounted in the outer end of the hub member 20 to support a hollow shaft 22 on the outer end of which a flange 23 of a wind fan 24 is secured. The hollow shaft 22, on the wind fan 24, extends within the spherical base 6 and has a bevelled pinion 25 fixed thereon, which is supported in anti-friction bearings 26 mounted within the hub 20. A shaft 27 is rotatably journaled in the hollow shaft 22. The shaft 27 extends beyond the outer face of the flange 23 and has a shouldered bushing 28 mounted thereon which extends into a recess 29 provided in the flange 23. The flange 30 of the wind fan 31 is detachably held on the shouldered bushing 28 by means of the locked bolt 32. The shouldered bushing 28, by reason of it being rotatably journaled in a recess in the flange 23, serves to support the wind fan 31 co-axially with the wind fan 24 and to prevent any axial disalignment of the respective wind fans. The opposite end of the shaft 27 is rotatably mounted in an anti-friction bearing 33 confined within the hub member 19 and the end of said shaft 27 projects beyond the end of the hub, for the purpose to be hereinafter described in detail. A bevel pinion 34 is mounted adjacent the end of the shaft 27, within the spherical base 6, said pinion 34 being of the same pitch diameter as the bevel pinion 25 on the shaft 22.

A bevel gear 35 is fixedly mounted on a shaft 36 journaled in a bearing 37 provided in the spherical base 6, at right angles to the pinions 25 and 34 with which it is placed in meshing engagement. The bevel gear 35 is driven in a common direction by the bevel pinions 25 and 34. The bevel gear 35 is provided with a plurality of holes 38 in the face thereof, arranged eccentrically to the axis of the shaft 36. An attaching pin 39 is adapted to engage the holes 38 for the purpose of pivotally connecting an end 40 of the connecting rod 41 to the bevel gear 35. The opposite end of the connecting rod 41 is pivotally connected at 42 to the plunger 9. Rotative movement of the gear 35 will impart a reciprocative movement to the plunger 9 and shaft 13 through the connecting rod 41. By changing the location of the end 40 of the connecting rod 41 to the differently located holes 38 in the gear 35, the axis of eccentricity of the connecting rod relative to the gear 35 may be varied to thus regulate and control the length of stroke of the plunger 9 and shaft 13.

The wind fans 24 and 31 are duplicates of each other, differing only in the respect that the fan blades 43 of the fan 24 are curved in an opposite direction to the fan blades 44 of the companion fan 31. I have found that by curving the blades of the respective wind fans in directions opposite to each other, and mounting the respective wind fans on independent shafts, that wind can be deflected from the first fan receiving the wind force onto the second wind fan, whereby the same wind force is put to a double use without its velocity being materially lessened. The action which takes place between my wind fans, wherein the moving air is deflected from the blades of one fan moving in one direction to the blades of a second wind fan moving in the opposite direction, is comparable to the "turbine" effect which takes place in a steam engine wherein "turbine" rotors are used. I have discovered that by mounting two wind fans in parallel planes on a common axis and adapted to revolve in opposite directions it becomes possible to reduce the outside diameter of the wind fans and to greatly increase the power torque delivered by said wind fans, above the power which would be delivered from a single wind fan having a diameter larger than either one of my two fans. Furthermore by providing two wind fans of a comparatively small diameter it becomes possible to reduce the cost of the "windmill" structure below the cost of making a single wind fan having a surface area the equivalent of my two wind fans. The wind fans 24 and 31 turning in opposite directions and driving the respective pinions 25 and 34, cause the bevel gear 35 to be rotated in a common direction under any and all conditions.

In order to keep the wind fans 24 and 31 facing the wind I have provided a tail or rudder 45 on the base 6. The tail 45 is provided with a pair of projecting arms 46 and 47 each of which are pivoted at 48 and 49 respectively to projections 50 and 51 provided on the upper and lower sides of the hub 19. The arm 46 of the tail 45 extends beyond the pivot 48 and over the base 6 so that the end 52 of said arm engages a resiliently covered pin 53 on the base 6 for the purpose of holding the tail 45 in an operative position substantially at right angles to the path of revolution of the two fans 24 and 31. A projection 54 extends outwardly from the arm 46, at right angles thereto, which arm engages the pin 53 when the tail 45 is swung around throughout an arc of 90° into an inoperative position substantially parallel to the path of revolution of the fans 24 and 31. A tension spring 55 is connected at one end 56 to the tail 45 and at its opposite end 57 to an extension 58, on the base 6, for the purpose of holding the tail 45 at substantially right angles to the fans 24 and 31. The spring 55 is of sufficient tension to normally hold the tail 45 at substantially right angles to the path of revolution of the two fans. In order to render the "windmill" inoperative by preventing the two fans from facing the wind, I have provided means for manually turning the tail 45 into an inoperative position parallel to the plane of the two fans. In order to accomplish the turning or swinging of the tail 45, I provide a collar 60 which is slidably mounted around the upper end of the frame 1. The collar 60 has a socket member 61 thereon in which the ball end of a shaft 62 is confined, the opposite ball end of the shaft 62 being mounted in a socket 63 provided on the pivot pin 49. The shaft 62 through its universal connection to the tail 45 and collar 60, serves to locate the collar 60 in a proper operating position on the frame 1. On the opposite side of the collar 60 a socket 64 is provided and in it the ball end of a shaft 65 is confined, the opposite ball of the shaft 65 being held in a ball socket 66 mounted on the projecting end 67 of a bracket 68 secured on the tail arm 47. In order to lift the collar 60 to swing the tail 45, a ring 69 is provided around the frame 1 beneath the collar 60. The ring 69 is connected by link members 70 to a handle 71 pivotally mounted at 72 on the frame 1. By lifting the handle 71 the ring 69 moves upwardly against the collar 60 and causes it to be elevated. The "universal" connecting rod 62 causes the collar 60 to partially rotate around the frame 1 as it moves upwardly. The rotative movement of the collar 60, imparted by the rod 62, causes the "universal" connecting rod 65 to rotate proportionately, and through its off-set connection to the tail 45 to swing the tail 45 around into any desired position within the 90° arc of movement, to which the tail 45 is limited. When the ring 69 is in the elevated position it creates a friction on the under side of the collar 60 sufficiently to slow down any turning movement of the base 6. In order to return the tail 45 to the operative position the handle 71 would be dropped and the tension of the spring 55 would pull the tail 45 around to its normal operative position. Although I have shown and described one particular form of apparatus for swinging the tail into and from operative position it is to be understood that any equivalent form of device might be substituted in lieu thereof.

Where the two fans 24 and 31 would be subjected to exceedingly high wind velocities which might prove detrimental to the entire structure, I have provided means by which a braking effect can be automatically applied to the two fans to control the operating speed thereof. To accomplish this I have rotatably mounted a cone pulley 74 on the tail 45. When the tail 45 lies at right angles to the two fans 24 and 31, the pulley 74 is inoperative. As the tail 45 swings around into the inoperative position, substantially parallel with the fans 24 and 31, the periphery of said pulley would approximate contact with a complementary faced cone pulley 75 mounted on the projecting end of the shaft 27. The contact of the pulleys 74 and 75 creates friction between the engaging parts sufficient to slow down the speed of rotation of the fans 24 and 31, and also to hold the fans 24 and 31 in a stationary position when the pulleys 74 and 75 are placed into contact by a swinging movement of the tail 45 actuated through the manually operated handle 71.

In order to make the operating mechanism within the base 6 accessible, I have provided a cover plate 78 on the said base which is held in place by the clamping member 79. By removing the cover plate 78 the operating mechanism within the base 6 can be lubricated whereby the entire mechanism will run in a bath of lubricant. The construction and arrangement of the mechanism is such that all parts thereof can be lubricated from the supply of lubricant contained within the base 6 without the necessity of resorting to any force feed lubrication system as sufficient clearances exist between the various shaft and bearing members to permit the flow of lubricant from one part to the other.

Having thus described this invention, what I claim and desire to secure by Letters Patent is:—

1. A windmill comprising a tower, a hollow base rotatable horizontally upon the tower, a pair of oppositely rotatable fans, a pair of telescoping independently rotatable coaxial shafts to which said fans are respectively secured, said shafts being disposed horizontally upon the base and offset from the vertical axis thereof, opposed bevel gear pinions secured in spaced relation upon said shafts, a bevel gear wheel journaled upon said base and disposed between said pinions and meshing therewith, a vertically extending driving shaft disposed in axial alinement with the base, a connecting rod disposed in axial alinement with the driving shaft and extending between said pinions and eccentrically pivoted to said toothed wheel.

2. A windmill comprising a tower, a base rotatable horizontally upon the tower, a tail pivotally connected to the base, a stop upon the base engaging the tail and holding the parts against relative movement in one direction, a tensionable element connecting the base and the tail and holding the tail in engagement with the stop, a plurality of fans, concentrically disposed fan shafts to which the fans are secured, said shafts being disposed upon the base and offset from the vertical axis thereof, a vertically extending driving shaft connected to the fan shafts and operable thereby and disposed in axial alinement with the base and offset with respect to the fan shafts whereby the base is caused to turn and move the fan at an angle to the direction of the wind when the pressure thereof upon the fan overcomes the resistance of the tensionable element.

3. A windmill comprising a tower, a base rotatable horizontally upon the tower, a wind fan rotatably mounted on the base, a driven member rotatably mounted on the base and operated by said wind fan, a driving rod connected to the driven member and operated thereby, a tail pivotally mounted on said base, means on said base to limit the pivotal movement of the tail to an operative position at a right angle to the fan and to an inoperative position parallel to said fan, a collar on said tower, obliquely disposed rod members universally connected to said tail and collar respectively, said collar being slidable vertically to move said rods obliquely and thereby turn the tail into an inoperative position.

In testimony whereof, I have hereunto set my hand at San Francisco, California, this 22nd day of August, 1924.

PATRICK R. CAMPION.